United States Patent
Baskett et al.

(10) Patent No.: US 6,308,577 B1
(45) Date of Patent: Oct. 30, 2001

(54) CIRCUIT AND METHOD OF COMPENSATING FOR MEMBRANE STRESS IN A SENSOR

(75) Inventors: Ira E. Baskett, Tempe; Andrew C. McNeil, Scottsdale, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/722,384

(22) Filed: Sep. 30, 1996

(51) Int. Cl.$^7$ ...................................................... G01B 7/16
(52) U.S. Cl. ................................................. 73/766; 73/796
(58) Field of Search .......................... 73/715, 720, 721, 73/723, 727, 755, 766, 796

(56) References Cited

U.S. PATENT DOCUMENTS

| | | |
|---|---|---|
| 3,663,833 | 5/1972 | Pao et al. . |
| 4,317,126 | 2/1982 | Gragg, Jr. . |
| 4,800,759 | 1/1989 | Hirata et al. . |
| 5,092,177 | * 3/1992 | Varacca .................................. 73/721 |
| 5,107,710 | * 4/1992 | Huck et al. ............................ 73/721 |
| 5,166,892 | * 11/1992 | Inoue et al. ............................ 73/766 |
| 5,193,394 | * 3/1993 | Suda ...................................... 73/766 |
| 5,291,788 | * 3/1994 | Oohata et al. ......................... 73/727 |

* cited by examiner

*Primary Examiner*—Max Noori

(57) ABSTRACT

A circuit and method for correcting a sense signal of a sensor (100) where the sense signal is reduced by a negative nonlinear error component introduced by membrane stress in a sensor structure (101). A first transducer (103) is disposed at a location (203) having substantial bending stress to produce a sense signal having a linear component and the nonlinear error component. A second transducer (102) is disposed at a location (202) with substantially zero bending stress to produce a sense signal having the nonlinear error component but a substantially zero linear component. The sense signal from the second transducer (102) is added to the sense signal from the first transducer (103) to correct the nonlinear error for producing a linear output sense signal ($V_{OUT}$) of the sensor (100) which is representative of the physical condition.

21 Claims, 2 Drawing Sheets

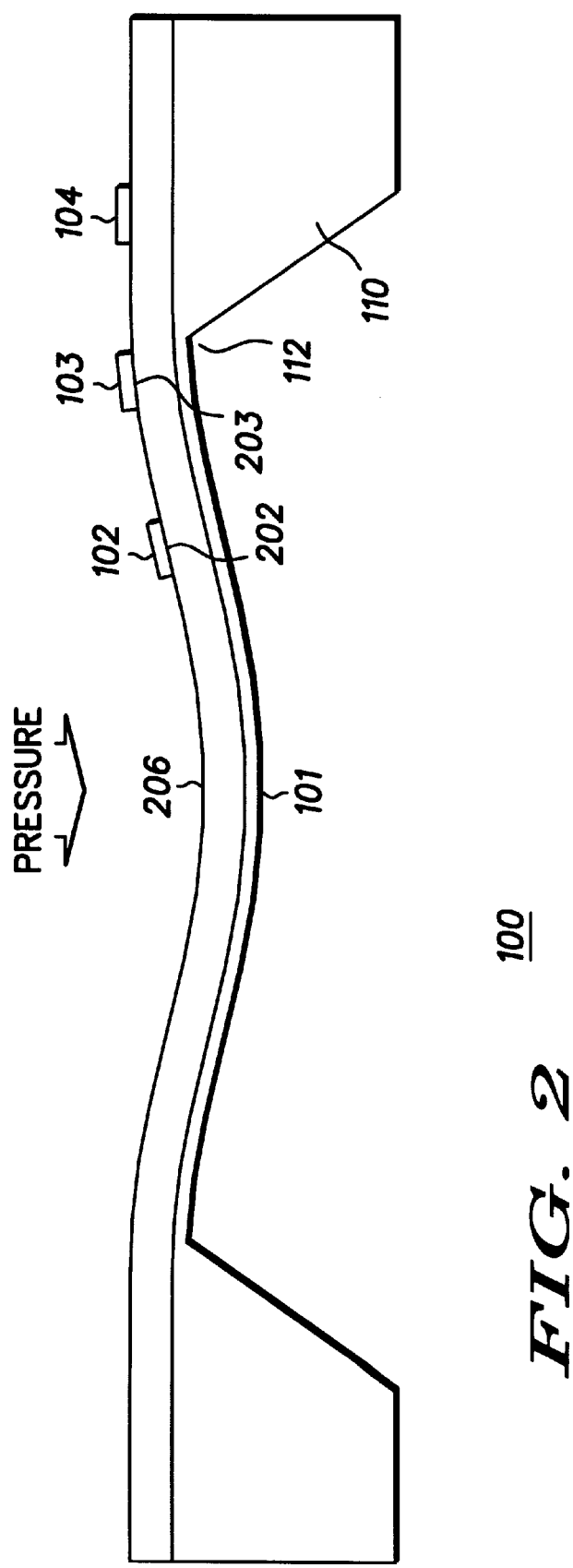

CIRCUIT AND METHOD OF COMPENSATING FOR MEMBRANE STRESS IN A SENSOR

BACKGROUND OF THE INVENTION

The present invention relates in general to sensor circuits and, more particularly, to a circuit for correcting a nonlinearity in a sensor signal.

Sensors are commonly used for converting physical conditions such as temperature, pressure, and acceleration to an electrical sensor signal for further processing. A typical sensor, such as a pressure sensor, includes a diaphragm for converting a pressure into a stress. A transducer converts the stress into the sensor signal which is typically amplified and filtered to provide a sensor output signal.

Ideally, there is a linear relationship between the physical condition and the sensor signal. However, in most if not all sensors, the sensor signal does not accurately represent the physical condition because of nonlinearities introduced by the deflection of the diaphragm. In the case of a pressure sensor, an applied pressure induces a plurality of stress components on the diaphragm. For example, a bending stress that is linearly related to the deflection of the diaphragm produces a linear output signal which is representative of the applied pressure.

Another one of the plurality of stress components in the diaphragm is a membrane stress. The membrane stress is related to the thickness and physical dimensions of the diaphragm and is produced when the diaphragm is stretched. Membrane stress contributes an undesirable nonlinear component to the sensor signal which increases as the applied pressure increases. The nonlinear component gives rise to an error term such that the sensor output signal does not accurately represent the applied pressure. The magnitude of the nonlinear component can be as high as five or ten percent, and even higher with sensors designed for use in harsh environments.

Many applications, including fuel injection systems in automobiles, medical applications such as blood pressure instruments, and environmental control systems, require high sensitivity and accuracy of better than one percent. Prior art pressure sensors typically use physical structures such as bosses to reduce the error. The bosses are thick structures disposed in the diaphragm to increase rigidity and constrain the deformation of the diaphragm. However, bosses reduce sensitivity and are therefore not suitable for low pressure applications. Moreover, bosses increase both the die size and the complexity of the diaphragm, which increases the manufacturing cost of the sensor.

Hence, a need exits for a sensor having a substantially linear output signal that accurately represents the sensed physical condition.

BRIEF DESCRIPTION OF THE DRAWINGS

FIG. 2 illustrates a side view of a sensor with pressure applied; and

DETAILED DESCRIPTION OF THE PREFERRED EMBODIMENT

Figure 1:
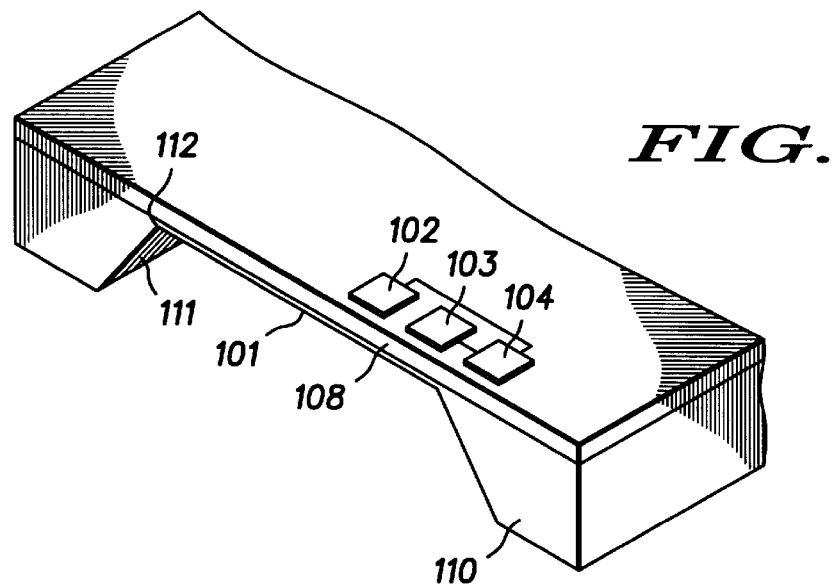
FIG. 1 illustrates an isometric view of a sensor.

Referring to FIG. 1, a sensor 100 is shown suitable for manufacture as an integrated circuit (IC) using conventional IC processes. Although the following discussion is directed to pressure sensors, the present invention is equally applicable to other types of sensors that convert a physical condition, e.g. acceleration and temperature, to an electrical signal. A sensor diaphragm 101 is formed by etching material from a substrate 110, which provides a mechanical base for diaphragm 101. A transducer 102, a transducer 103, and an error compensation circuit 104 are formed on an upper surface of pressure sensor 100. Transducers 102 and 103 each produce a sense signal which is coupled to error compensation circuit 104.

The etching process which forms diaphragm 101 is preferably an anisotropic etch so that material is removed along a predictable plane 111 of substrate 110. An anisotropic etch facilitates identifying the location of diaphragm edge 112 from the upper surface of sensor 100 for providing a reference for disposing transducers 102 and 103 and error compensation circuit 104. An epitaxial layer 108 is formed on substrate 110 to provide an etch stop during the anisotropic etching process. Epitaxial layer 108 further provides a high quality base for building transducers 102 and 103 and error compensation circuit 104 on sensor 100. Typically, epitaxial layer 108 is formed to a thickness of about 15 microns. Diaphragm 101 typically has a thickness between 15 and 18 microns, and a width of 1000 to 2000 microns.

Transducer 102 and transducer 103 are formed in or on top of epitaxial layer 108 for sensing a deformation of diaphragm 101 when a pressure is applied. Transducers 102 and 103 each typically comprise a piezoresistive device such as a Wheatstone bridge or pressure-sensitive resistor. Another example of transducer 103 is disclosed in U.S. Pat. No. 4,317,126 and is hereby incorporated by reference. Yet another example of transducer 103 is disclosed in U.S. patent application Ser. No. 08/395,228, filed Feb. 27, 1995 by Brian D. Meyer et al. and assigned to Motorola, Inc. Transducers 102 and 103 provide transducer output voltages as a function of the displacement of diaphragm 101.

Referring to FIG. 2, a cross-sectional side view of sensor 100 is shown (not to scale) comprising substrate 110 and diaphragm 101 over which is formed epitaxial layer 108. Elements assigned the same reference number used in FIG. 1 provide a similar function. A pressure applied to sensor 100 causes a deflection of diaphragm 101. Transducer 102 is disposed on diaphragm 101 at location 202 and transducer 103 is disposed on diaphragm 101 at location 203. An error compensation circuit 104 is formed on substrate 110 at a location where pressure-induced stresses in diaphragm 101 do not affect the operation of error compensation circuit 104. For example, error compensation circuit 104 is shown in FIG. 2 disposed above substrate 110 and 50 microns to the side of diaphragm 101. A location 206 defines a point of symmetry where diaphragm 101 has a maximum deflection. Location 206 is typically located at the midpoint of diaphragm 101 assuming a uniform pressure distribution.

A plurality of stress mechanisms are induced in diaphragm 101 when diaphragm 101 is deflected in response to the applied pressure. One of the stress mechanisms known as bending stress is proportional to the deflection and results from bending of diaphragm 101 upon application of the applied pressure. The bending stress is proportional to the magnitude of bending at any point along diaphragm 101. The sensor output signal varies linearly with the bending stress. Therefore, the bending stress is an accurate indicator of the applied pressure.

The magnitude of bending varies at different points on diaphragm 101. The bending stress appears as a tensile stress on the upper surface of diaphragm 101 in the region between diaphragm edge 112 and location 202, and as a compressive stress on the upper surface of diaphragm 101 in the region between location 202 and location 203. The bending stress due to tensile stress begins at diaphragm edge 112 and increases to a maximum value at location 203. The tensile stress decreases to zero in the region between location 203 and location 202. In the region from location 202 to location 206, diaphragm 101 is subjected to increasing compressive stress which reaches a maximum at location 206. Therefore, location 202 is the transition point from a region of decreasing tensile stress to a region of increasing compressive stress in diaphragm 101. As a result, the bending stress at location 202 is substantially zero.

Location 203 is a point on the upper surface of diaphragm 101 in the region of tensile stress where bending stress is at a local maximum. The point of maximum bending stress, i.e. location 203, does not change significantly as a function of applied pressure. Therefore, transducer 103 is typically disposed at location 203 in order to produce the maximum piezoresistive variation and maximum sense signal from transducer 103. The substantial bending stress at location 203 of diaphragm 101 produces a linear component in the sense signal of transducer 103 which is therefore representative of the applied pressure.

Membrane stress is another type of stress induced in diaphragm 101 when applied pressure causes diaphragm 101 to stretch. Membrane stress is essentially constant along diaphragm 101. Thus, the membrane stress present at location 202 is equal to the membrane stress present at location 203. Membrane stress produces a negative nonlinear error component which reduces the magnitude of the sensor signal from transducer 103. With the membrane stress acting on diaphragm 101, the sensor signal from transducer 103 is not truly representative of the applied pressure. Where diaphragm 101 is say sixteen microns thick and has a width of say 1,200 microns, the nonlinear error component becomes significant when the applied pressure deflects diaphragm 101 approximately six microns.

Transducer 102 is disposed on diaphragm 101 at location 202, a location having substantially zero bending and substantially zero bending stress. The sense signal produced by transducer 102 has a substantially zero linear component. The sense signal produced by transducer 102 is a nonlinear error signal produced by membrane stress in diaphragm 101. The bending stress is not present at location 202 and therefore is not present in the sensor signal from transducer 102. The uniform membrane stress in diaphragm 101 produces a membrane stress at location 202 which is equal to the membrane stress at location 203, so that the nonlinear error signal produced by transducer 102 is equal to the nonlinear error component of the sense signal produced by transducer 103. The sense signals produced by transducers 102 and 103 are respectively coupled to error compensation circuit 104, which adds the transducer 102 sense signal from the transducer 103 sense signal to produce an output sense signal of sensor 100 whose nonlinear component is substantially zero.

Locations 202 and 203, the optimum sites for disposing transducers 102 and 103, are typically determined during the design phase of sensor 100 by modeling sensor 100 using a well-known finite element analysis. The finite element analysis is performed in order to predict the behavior of diaphragm 101 when pressure is applied and to analyze the local stresses induced in diaphragm 101 prior to mass producing sensor 100. The modeling of sensor 100 is based on input data describing the structural geometry and materials comprising sensor 100. The input data include such information as the physical dimensions of sensor 100, the range of applied pressure over which sensor 100 operates, and physical parameters, such as Young's modulus and Poisson's ratio, which characterize the semiconductor material comprising sensor 100. The finite element analysis calculates the magnitude of stress at each point along diaphragm 101 as a function of applied pressure. Output data are provided either graphically as a contour plot, or in tabular form. From the tables or contour plots, location 202 and location 203, the points of maximum and minimum bending stress, are readily apparent. Each of the locations 202 and 203 can be shown to be fixed locations which do not change when applied pressure changes the deflection of diaphragm 101.

A sensing structure is defined as the portion of a sensor which produces a stress in response to a physical condition. A transducer converts the stress to an electrical sense signal. The sensor 100 shown in FIG. 2 is an embodiment of sensor 100 which is a pressure sensor having a sensing structure which is diaphragm 101. It is understood that similar principles could be used to produce alternative embodiments of sensor 100, such as an acceleration sensor in which the sensing structure is a beam which is deflected in response to an applied acceleration, or a temperature sensor in which the sensing structure is a bi-metallic element which is deflected in response to a temperature change.

Figure 3:
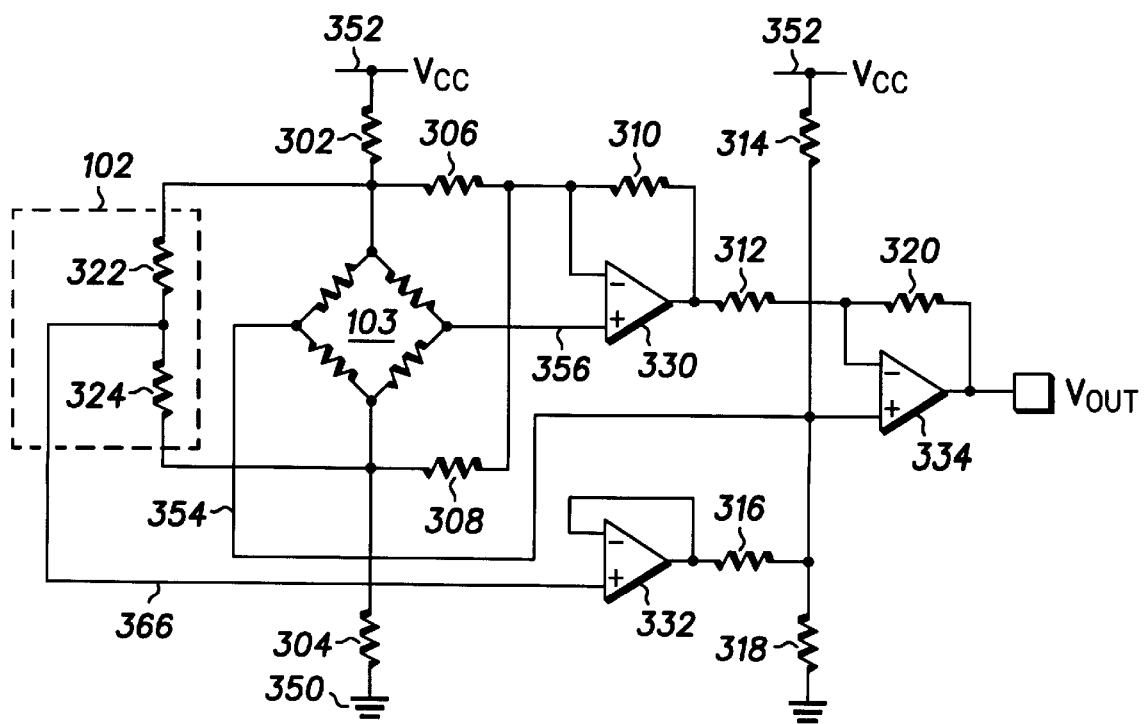
FIG. 3 illustrates a schematic diagram of an error compensation circuit.

Referring to FIG. 3, a schematic diagram is shown of an error compensation circuit 104, a transducer 102, and a transducer 103. Transducer 103 is shown as a conventional Wheatstone bridge coupled at node 360 to a resistor 302 and at node 362 to a resistor 304. Resistor 302 is further coupled to a power supply conductor 352 operating at $V_{cc}$=5.0 volts. Resistor 304 is coupled to a power supply conductor 350 operating at ground potential. Transducer 103 has an output terminal 356 coupled to a non-inverting input of amplifier 330 and an output terminal 354 coupled to a non-inverting input of amplifier 332.

Transducer 103 is comprised of piezoresistive resistors having a positive temperature coefficient. Resistors 302 and 304 have temperature coefficients which are preferably zero such that the potential between nodes 360 and 362 increases with increasing temperature to provide a more constant sense signal across output terminals 354 and 356. Transducer 103 is disposed at location 203 of diaphragm 101 such that the signal provided at the output of transducer 103 has a linear bending stress component as well as a nonlinear membrane stress component.

Transducer 102 includes resistors 322 and 324 serially coupled between nodes 360 and 362. Resistors 322 and 324 are commonly coupled to an output terminal 366 of transducer 102. Typically, resistor 322 is a piezoresistive element whose resistance varies with applied pressure to produce a sense signal at output terminal 366 of transducer 102. Resistor 324 can be a piezoresistive element whose resistance varies in response to pressure applied to sensor 100.

Transducer 102 is disposed on diaphragm 101 at location 202, a point on the upper surface of diaphragm 101 having substantially zero bending. Therefore, the sense signal provided at output terminal 366 of transducer 102 is a nonlinear error signal resulting from membrane stress in diaphragm 101 with a substantially zero linear component. The sense signal produced at output terminal 366 of transducer 102 is shown as a single-ended sense signal. It is understood that one of ordinary skill in the art could modify transducer 102 in accordance with the principles of the present invention to provide a differential output signal.

In basic operation, error compensation circuit 104 corrects for the negative nonlinear error in the sensor signal from transducer 103 by adding the sense signal of transducer 102 to the sense signal of transducer 103. An amplifier stage comprising amplifier 330, resister 306, resister 308, and resistor 310 receives the sense signal of transducer 103 at terminal 356 for buffering and amplifying. An amplifier stage comprising amplifier 334, resistor 320, and resistor 312 buffers and amplifies the sense signal of transducer 103 which is provided at terminal 354. Resistors 306 and 308 produce a bias voltage at an inverting input of amplifier 330 for adjusting the temperature coefficient of the zero pressure offset of sensor 100. In order to minimize the common mode signal from transducer 103, resistor 310 is preferably equal to resistor 312, and resistor 320 is preferably equal to the equivalent parallel resistance of resistor 306 and 308. Resistors 314 and 318 set the zero-pressure operating point of amplifier 334.

Amplifier 332 has a non-inverting input coupled to the output of transducer 103. Amplifier 332 is configured as a unity gain amplifier which provides a buffer stage to avoid loading transducer 102. Resistors 316 and 312 comprise a summing circuit which sums the respective outputs of amplifiers 332 and 330 at a non-inverting input of amplifier 334. Recall that output terminal 354 of transducer 103 is coupled to a non-inverting input of amplifier 334, whereas the output of amplifier 330 is coupled to the inverting input of amplifier 334. Amplifier 334 cancels the negative nonlinear component of the sense signal from transducer 103 by adding the sense signal of transducer 102 to the sense signal of transducer 103. The error corrected output sense signal $V_{OUT}$ is a linear output signal which is representative of the physical condition of sensor 100. Resistor 320 sets the voltage gain of amplifier 334 to produce the desired amplitude of output sense signal $V_{OUT}$ of sensor 100.

In an alternate embodiment of the present invention, the Wheatstone bridge arrangement of transducer 102 may be oriented such that the nonlinear error signal due to membrane stress adds to the linear component of the sensor signal due to bending stress. In that case, the nonlinear error signal from transducer 102 is subtracted from the sensor signal from transducer 103 to produce a linear, error corrected output sense signal $V_{OUT}$ which is representative of the physical condition of sensor 100.

By now it should be appreciated that the present invention provides a circuit and method for correcting an error in a sense signal of a sensor subjected to a bending stress and a membrane stress, where the bending stress linearly represents a physical condition of the sensor and the membrane stress introduces a nonlinear error component into the sense signal. A transducer is disposed at a location of maximum bending stress in the sensing structure to produce a sense signal having a maximum linear component as well as the nonlinear error component. Another transducer is disposed at a location of minimum bending stress to produce a signal having the nonlinear error component but a substantially zero linear component. The sense signals from the two transducers are combined to cancel the nonlinear error component. A resulting output signal of the sensor is substantially linear and therefore representative of the sensed physical condition.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A sensor, comprising:
   a sensing structure having a first location with substantially zero bending in response to a physical condition, wherein the substantially zero bending occurs at a transition between tensile stress and compressive stress at a surface of the sensing structure in response to the physical condition; and
   a first transducer disposed at the first location for converting a membrane stress in the sensing structure to a first sense signal.

2. The sensor of claim 1 wherein the sensing structure further includes a second location that bends in response to the physical condition.

3. The sensor of claim 2 wherein the sensing structure includes a diaphragm that bends in response to the physical condition such that the second location has substantial bending and the first location has substantially zero bending at the transition between the tensile stress and compressive stress at the surface of the sensing structure.

4. The sensor of claim 2 wherein the sensing structure includes a beam that bends in response to the physical condition such that the second location has substantial bending and the first location has substantially zero bending at the transition between the tensile stress and compressive stress at the surface of the sensing structure.

5. The sensor of claim 2 further including a second transducer disposed at the second location for converting the physical condition to a second sense signal having an error component introduced by the membrane stress in the sensing structure in response to the physical condition.

6. The sensor of claim 5 further including an error compensation circuit having a first input coupled for receiving the first sense signal, a second input coupled for receiving the second sense signal, and an output for providing an error corrected output sense signal.

7. The sensor of claim 6 wherein the error compensation circuit includes:
   a summing circuit having a first input coupled for receiving a first component of the second sense signal, and a second input coupled for receiving the first sense signal; and
   a first amplifier having a first input coupled to an output of the summing circuit, a second input coupled for receiving a second component of the second sense signal, and an output for providing the error corrected output sense signal.

8. The sensor of claim 7 wherein the error compensation circuit further includes:
   a second amplifier having a first input coupled to a first source of bias voltage, a second input coupled to a first output of the second transducer, and an output coupled to the first input of the summing circuit; and
   a third amplifier having a first input coupled to an output of the first transducer, an output coupled to the second input of the summing circuit, and a second input coupled to the output of the third amplifier.

9. The sensor of claim 1 wherein the first sense signal is representative of an error component introduced by the membrane stress in the sensing structure in response to the physical condition.

10. The sensor of claim 9 wherein the first transducer includes a piezoresistive element for converting the physical condition to the first sense signal representative of the error component.

11. The sensor of claim 10 wherein the piezoresistive element includes a first resistor disposed at the first location and coupled between a first source of bias voltage and an output of the first transducer.

12. The sensor of claim 11 wherein the first transducer further includes a second resistor coupled between a second source of bias voltage and the output of the first transducer.

13. A method of sensing a physical condition, comprising the steps of:
   providing a sensing structure that bends in response to a physical condition and develops a membrane stress at a first location that has substantially zero bending; and
   sensing the membrane stress at the first location for providing a first sense signal.

14. The method of claim 13 wherein the substantially zero bending occurs at a transition between tensile stress and compressive stress at a surface of the sensing structure in response to the physical condition.

15. The method of claim 14 wherein the first sense signal is representative of an error component introduced by a membrane stress in the sensing structure in response to the physical condition.

16. The method of claim 15 further comprising the steps of:
   sensing membrane stress and bending stress at a second location for providing a second sense signal having the error component; and
   combining the first and second sense signals to remove the error component of the second sense signal.

17. A sensor, comprising:
   a sensing structure having a first location with substantially zero bending and a second location that bends in response to a physical condition;
   a first transducer disposed at the first location of the sensing structure for providing a first sense signal representative of an error component introduced by a membrane stress in the sensing structure in response to the physical condition;
   a second transducer disposed at the second location for converting the physical condition to a second sense signal having the error component; and
   an error compensation circuit having a first input coupled for receiving the first sense signal, a second input coupled for receiving the second sense signal, and an output for providing an error corrected output sense signal.

18. The sensor of claim 17 wherein the substantially zero bending occurs at a transition between tensile stress and compressive stress at a surface of the sensing structure in response to the physical condition.

19. The sensor of claim 18 wherein the sensing structure includes a diaphragm that bends in response to the physical condition such that the second location has substantial bending and the first location has substantially zero bending at the transition between the tensile stress and compressive stress at the surface of the sensing structure.

20. The sensor of claim 18 wherein the first transducer includes:
   a piezoresistive element disposed at the first location and coupled between a first source of bias voltage and an output of the first transducer for converting the physical condition to the first sense signal representative of the error component; and
   a second resistor coupled between a second source of bias voltage and the output of the first transducer.

21. The sensor of claim 20 wherein the error compensation circuit includes:
   a summing circuit having a first input coupled for receiving a first component of the second sense signal, and a second input coupled for receiving the first sense signal;
   a first amplifier having a first input coupled to an output of the summing circuit, a second input coupled for receiving a second component of the second sense signal, and an output for providing the error corrected output sense signal;
   a second amplifier having a first input coupled to a first source of bias voltage, a second input coupled to a first output of the second transducer, and an output coupled to the first input of the summing circuit; and
   a third amplifier having a first input coupled to an output of the first transducer, an output coupled to the second input of the summing circuit, and a second input coupled to the output of the third amplifier.

* * * * *

UNITED STATES PATENT AND TRADEMARK OFFICE
CERTIFICATE OF CORRECTION

PATENT NO.    : 6,308,577 B1
DATED         : October 30, 2001
INVENTOR(S)   : Baskett et al.

It is certified that error appears in the above-identified patent and that said Letters Patent is hereby corrected as shown below:

<u>Title page,</u>
Item [*], Notice, delete "0" and insert -- 593 --.

Signed and Sealed this

First Day of July, 2003

JAMES E. ROGAN
*Director of the United States Patent and Trademark Office*